(12) United States Patent
Alvi

(10) Patent No.: US 8,303,024 B2
(45) Date of Patent: Nov. 6, 2012

(54) MICROJET CONTROL FOR FLOW AND NOISE REDUCTION IN AUTOMOTIVE APPLICATIONS

(75) Inventor: Farrukh S. Alvi, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 132 days.

(21) Appl. No.: 13/031,384

(22) Filed: Feb. 21, 2011

(65) Prior Publication Data

US 2011/0203673 A1 Aug. 25, 2011

Related U.S. Application Data

(60) Provisional application No. 61/338,627, filed on Feb. 22, 2010.

(51) Int. Cl.
*B62D 37/02* (2006.01)
(52) U.S. Cl. .................. 296/180.1; 296/217
(58) Field of Classification Search .... 296/180.1–180.5, 296/217; 224/130; 137/13
See application file for complete search history.

(56) References Cited

U.S. PATENT DOCUMENTS

| | | | | |
|---|---|---|---|---|
| 3,259,065 A * | 7/1966 | Ross et al. | | 244/3.1 |
| 3,261,576 A * | 7/1966 | Valyi | | 244/130 |
| 3,529,862 A * | 9/1970 | Jousserandot | | 296/180.1 |
| 4,160,494 A * | 7/1979 | McCambridge | | 188/270 |
| 4,353,587 A * | 10/1982 | Brenholt | | 296/180.3 |
| 4,375,898 A * | 3/1983 | Stephens | | 296/180.3 |
| 5,374,098 A * | 12/1994 | Nelson | | 296/180.1 |
| 5,544,931 A * | 8/1996 | Nelson | | 296/180.1 |
| 6,086,146 A * | 7/2000 | Nabuurs | | 296/217 |
| 6,276,636 B1 * | 8/2001 | Krastel | | 244/130 |
| 6,378,932 B1 * | 4/2002 | Fasel et al. | | 296/180.5 |
| 6,637,805 B2 * | 10/2003 | Rees | | 296/180.1 |
| 6,779,834 B1 * | 8/2004 | Keller | | 296/180.4 |
| 2001/0035662 A1 * | 11/2001 | Pike et al. | | 296/91 |
| 2006/0290169 A1 * | 12/2006 | Fukushima et al. | | 296/180.1 |
| 2008/0157561 A1 * | 7/2008 | Farber | | 296/180.5 |
| 2009/0256387 A1 * | 10/2009 | Pfertner et al. | | 296/180.3 |
| 2010/0078963 A1 * | 4/2010 | Dittrich et al. | | 296/180.5 |

* cited by examiner

*Primary Examiner* — Lori Lyjak

(74) *Attorney, Agent, or Firm* — J. Wiley Horton

(57) ABSTRACT

The present invention comprises a method and associated devices for reducing the noise produced by an open cavity within a moving automobile (such as open sunroofs and open windows). The invention proposes placing microjet orifices proximate the open cavity. These inject small but rapidly moving columns of air into the prevailing flow. The projected columns reduce the formation of large coherent structures in the prevailing flow. As these large coherent structures are a critical component of the resonance which is responsible for much of the noise produced across the open cavity, the overall noise level is reduced by the microjets.

20 Claims, 8 Drawing Sheets

MICROJET CONTROL FOR FLOW AND NOISE REDUCTION IN AUTOMOTIVE APPLICATIONS

CROSS-REFERENCES TO RELATED APPLICATIONS

This application is a non-provisional application claiming the benefit (pursuant to 37 C.F.R. §1.53(c) of an earlier-filed provisional application. The patent application was filed on Feb. 22, 2010 and was assigned application Ser. No. 61/338,627. The parent application listed the same inventor.

STATEMENT REGARDING FEDERALLY SPONSORED RESEARCH OR DEVELOPMENT

None.

MICROFICHE APPENDIX

Not Applicable

BACKGROUND OF THE INVENTION

1. Field of the Invention

This invention relates to the field of flow and noise control in an incompressible and/or compressible fluid. More specifically, the invention comprises the use of microjets to reduce noise caused by air flowing over an open cavity such as a sunroof opening or an open window in an automobile.

2. Description of the Related Art

Modern automobiles are designed to provide smooth airflow over their exterior surfaces. Careful design has resulted in a substantial reduction in interior noise—even at highway speeds. Passengers are now accustomed to a relatively quiet environment in which music may be clearly heard and voice communications over cellular telephones are routine. This low ambient noise level is lost, however, when a window or sunroof is opened.

The flow phenomena occurring across an open sunroof and an open window are grossly similar. A sunroof therefore makes a good general example. FIG. 1 shows a sectional elevation view through the roof of a prior art automobile. Roof 20, along with the rest of the automobile's passenger compartment, creates interior 14. Exterior 16 experiences airflow 22 when the car is in motion. Sunroof assembly 10 includes sliding panel 12 and pocket 18 into which the sliding panel retracts when the sunroof is opened.

FIG. 2 shows the same assembly with sliding panel 12 retracted into pocket 18. This creates opening 24, through which air can flow between exterior 16 and interior 14. The result is a dramatic increase in aerodynamic noise inside the cabin. This noise is frequently dominated by "tones" which are pressure pulses centered on discrete frequencies. These cyclic pulses are annoying at best and intolerable at worst. The result is that most vehicle occupants now ride with the windows rolled up and the sunroof closed.

The discrete frequencies produced are likely created by a flow-induced resonance phenomenon. Air flowing over the automobile's exterior tends to lift free from the surface at leading edge 26 of opening 24. The air coming from the leading edge is commonly referred to as a shear layer which separates from the leading edge of the opening and begins to roll up into large-scale rotating structures due to the well-known Kelvin-Helmholtz instability mechanism. When these structures strike the trailing edge of the opening, strong acoustic waves are generated. Under the appropriate conditions, the flow becomes self-excited and significant amplification results.

BRIEF SUMMARY OF THE INVENTION

The present invention comprises a method and associated devices for reducing the noise produced by an open cavity within a moving automobile. Exemplary open cavities include open sunroofs and open windows. The invention proposes placing microjet orifices proximate the open cavity. These inject small but rapidly moving columns of air into the prevailing flow. The projected columns reduce the formation of large coherent structures in the prevailing flow. As these large structures are a critical component of the resonance which is responsible for much of the noise produced across the open cavity, the overall noise level is reduced by the microjets. The microjets can also reduce the overall drag created by an open cavity.

REFERENCE NUMERALS IN THE DRAWINGS

| | |
|---|---|
| 10 | sunroof assembly |
| 12 | sliding panel |
| 14 | interior |
| 16 | exterior |
| 18 | pocket |
| 20 | roof |
| 22 | airflow |
| 24 | opening |
| 26 | leading edge |
| 28 | microjet orifice |
| 29 | microjet orifice |
| 30 | valve |
| 31 | valve |
| 32 | pressure source |
| 34 | microjet |
| 36 | extending passive device |
| 38 | car |
| 40 | engine |
| 42 | mechanical compressor |
| 44 | drive belt |

DETAILED DESCRIPTION OF THE INVENTION

The present invention proposes to locate a plurality of microjet orifices in proximity to a selectively opened cavity in an automobile. Examples of such a selectively opened cavity include windows and sunroofs. The microjets can be placed in any suitable position according to the requirements of the particular application. However, those skilled in the art will know that air flow over the external surfaces of a moving automobile moves in only one principal direction. Thus, the microjets will typically be located just upstream or in the vicinity of the cavity in question.

Figure 1:
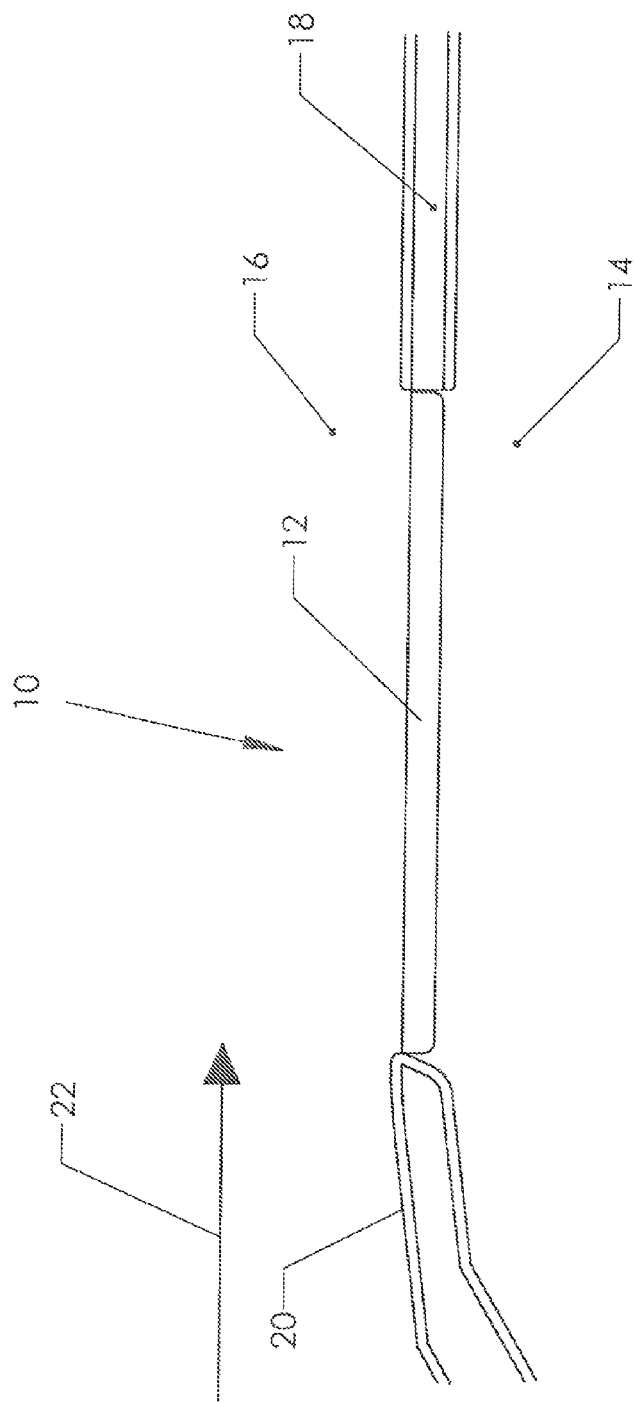
FIG. 1 is a sectional elevation view, showing a prior art sunroof in the closed position.
Figure 2:
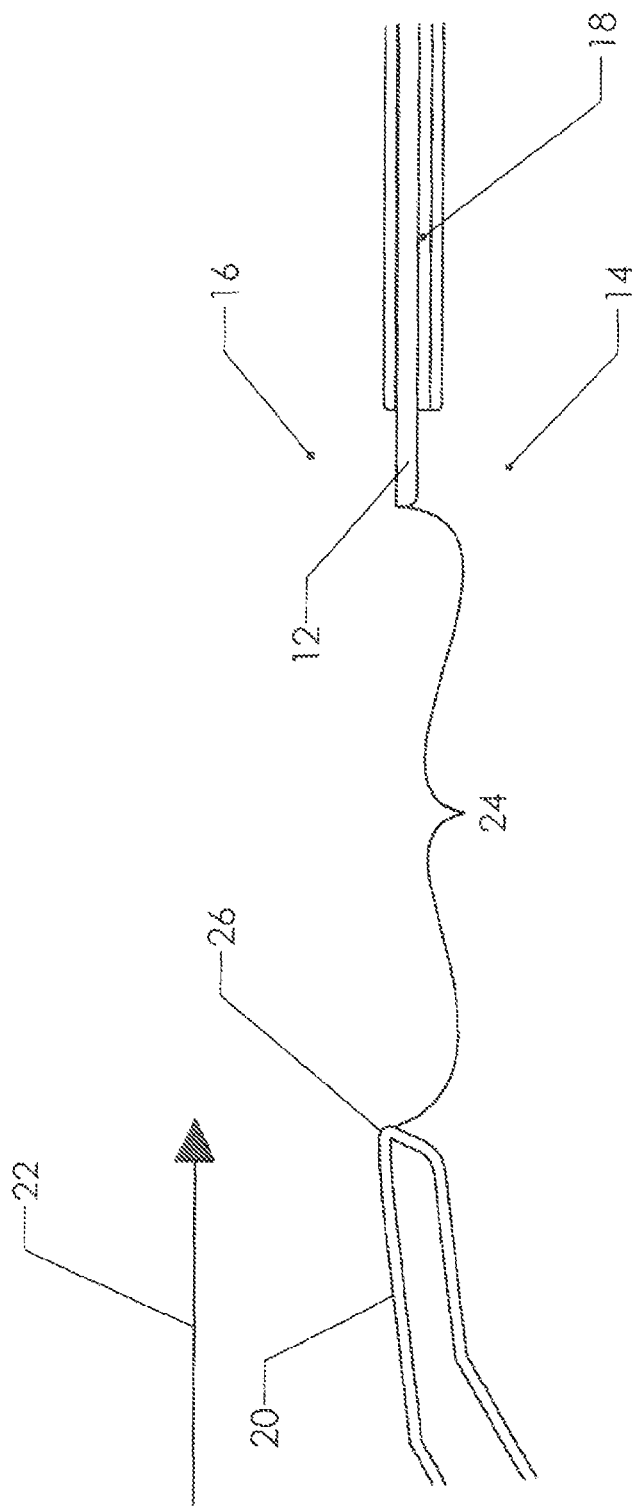
FIG. 2 is a sectional elevation view, showing a prior art sunroof in the open position.
Figure 3:
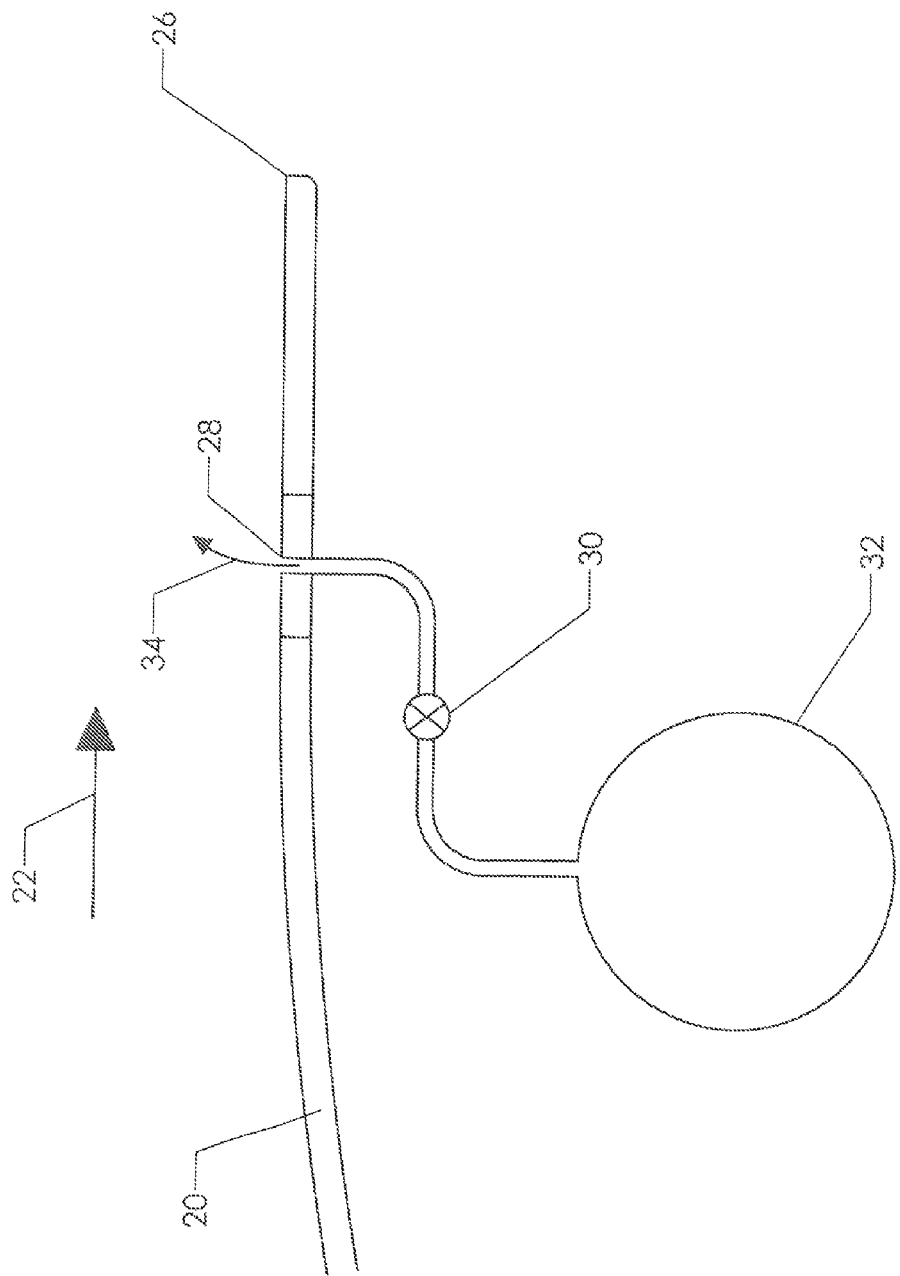
FIG. 3 is a sectional elevation view, showing a microjet and associated valve and pressure supply.

FIG. 2 shows leading edge 26 of a sunroof opening 24. An array of microjets is preferably placed near this leading edge. FIG. 3 shows a schematic representation of one microjet in such an array. Roof 20 is experiencing a substantially parallel airflow 22. Microjet orifice 28 is positioned just upstream of leading edge 26. In the example shown, the orifice is oriented to project microjet 34 in a direction which is roughly perpendicular to airflow 22 (approximately normal to the surface). The microjet need not be perfectly normal to the surface, and in some applications canting the microjet as much as 30 degrees or more off-normal map be beneficial.

Figure 8:
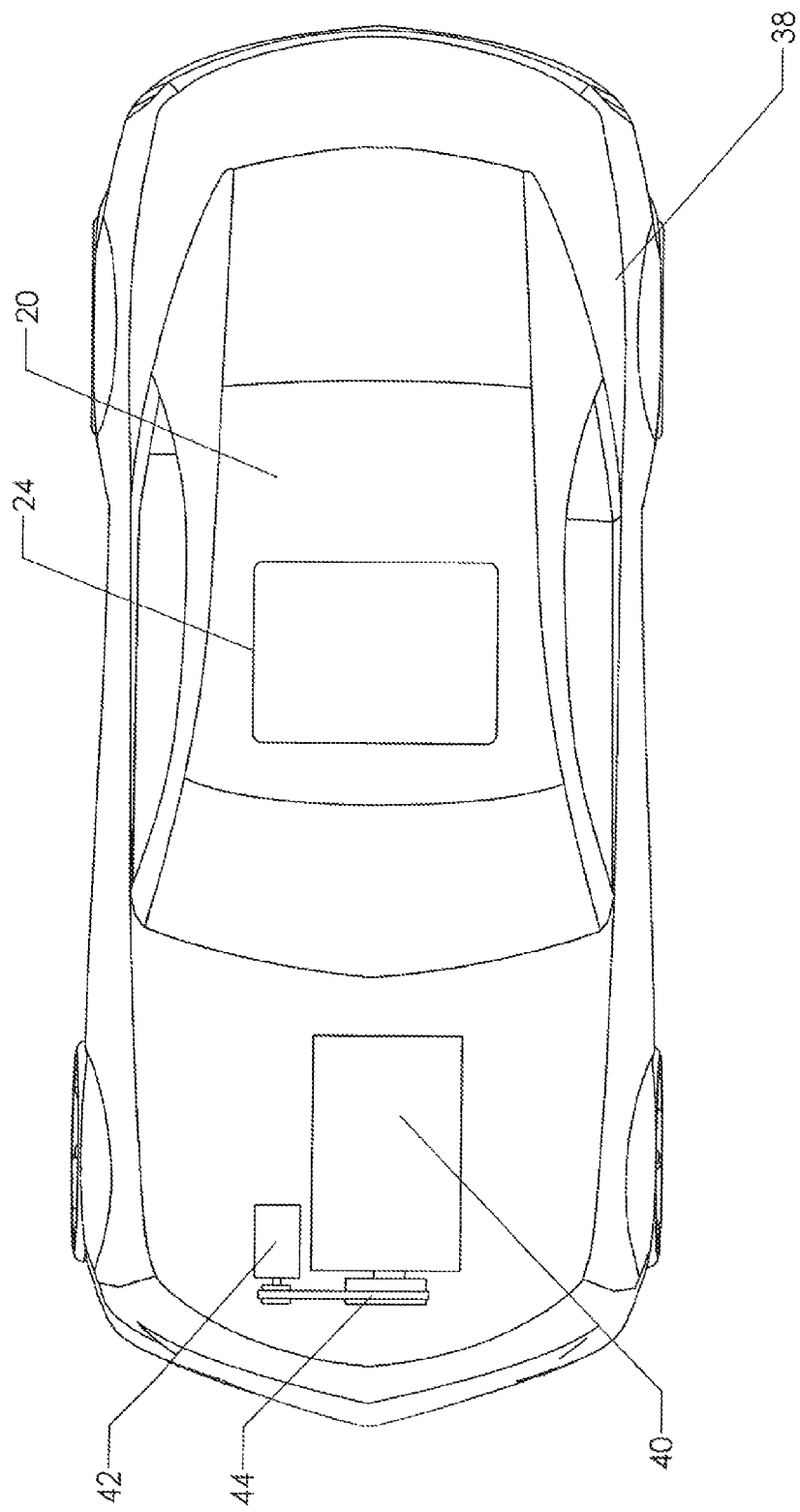
FIG. 8 is a plan view, showing a mechanical compressor that is driven by a vehicle's engine.

Pressure source 32 feeds pressurized air to the microjet. One or more valves 30 can be provided to control the flow. The valve may be a discrete on/off type or throttling type. The pressure source preferably supplies air between about 2 psig and 30 psig, although different ranges maybe desirable dependant upon specific automobile configuration. This is a relatively low pressure that can be accommodated using inexpensive conduits, fittings, and valves. The source of the pressure can be a mechanical compressor driven by a serpentine belt on the vehicle's engine, an electrical compressor powered by the vehicle's electrical system, or other known pressure sources. FIG. 8 shows an embodiment including mechanical compressor 42. This may be connected to engine 40 and driven by drive belt 44. It is also possible to provide an electrically-powered compressor that is mounted in a location such as shown in FIG. 8 but driven by the vehicle's electrical system.

The microjet orifice itself serves as a small expansion nozzle. A typical size is a diameter of 400 micrometers, or about 0.016 inches. The typical range of size is from about 200 micrometers to about 1 mm. The microjet is configured to project a very rapidly moving column of flow into the prevailing airflow. Because of the high momentum of this rapidly moving air the column will persist for a significant distance away from the surface where the microjet orifice is located. This phenomenon creates a "finger" of upward moving air which splits the incoming flow and forces it to flow around the column. The result is a generation of voritcity (rotating flow) and significant disruption in the formation of large scale coherent structures which are a critical component of the resonance that tends to produce the annoying low frequency noise.

The microjet orifice itself may have a smoothly contoured shape (such as a DeLaval expansion profile), or it may have a simpler profile including straight side walls. The input stagnation pressure to each microjet or array of microjets is preferably controlled within a reasonable variation. As one example—suited to a particular application—the stagnation pressure could be controlled within a tolerance of about 7 kPa or 1 psi. The microjet is shown in FIG. 3 as being normal to the surface it vents through, which is an effective configuration. However, in some circumstances, it may be desirable to tilt the microjet. It may also be desirable to provide a variable tilt for the microjet so that the angle of injection can be adjusted for varying circumstances (such as a partially open window as opposed to a fully open one).

Figure 4:
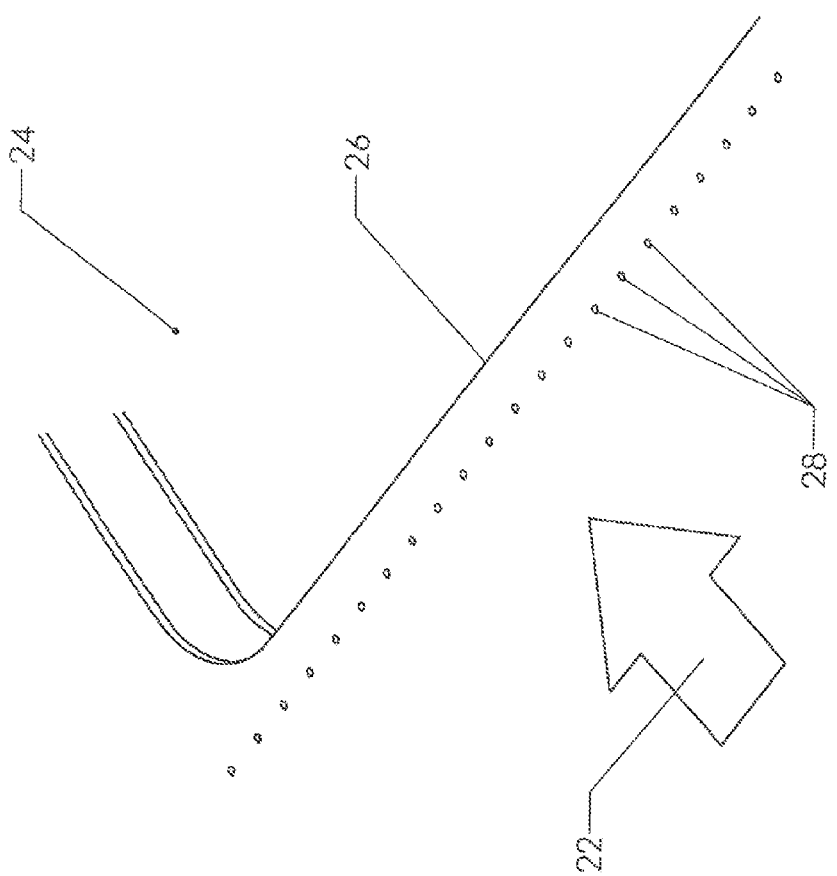
FIG. 4 is a perspective view, showing an array of microjets along the leading edge of an opening.

In most applications it will be preferable to provide two or more microjets arranged in an array proximate the leading edge of the opening. FIG. 4 shows a perspective view of opening 24 (in this case a sunroof). Airflow 22 approaches leading edge 26 as shown. An array of microjet orifices 28 are placed along the leading edge as shown. The array shown is linear, but this need not always be the case. Multiple rows of orifices can be used. It is also possible to stagger the single line of microjets in a "lazy W" pattern.

Figure 7:
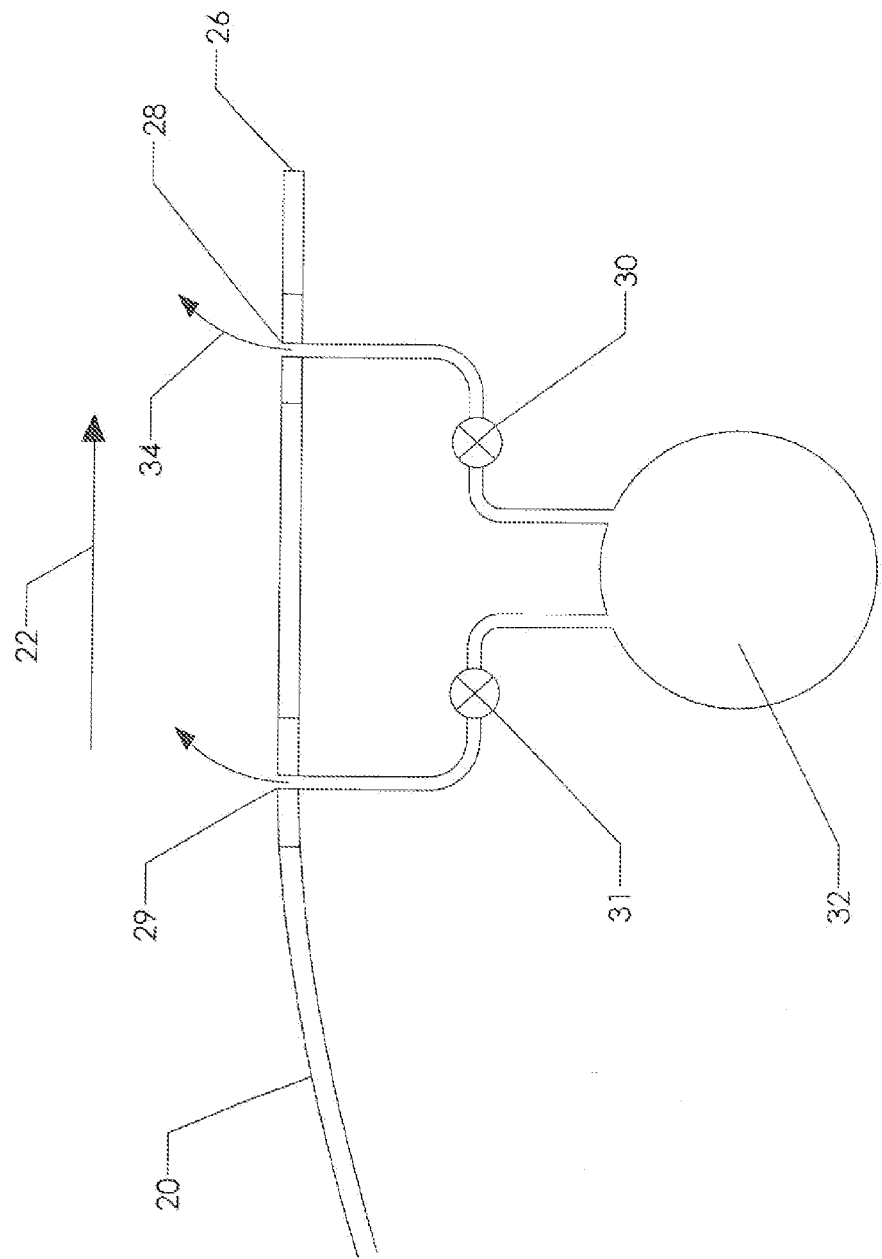
FIG. 7 is a sectional elevation view, showing two microjets and associated valves and pressure supply.

The microjets are optionally grouped into two or more subsets within the array. Each subset can have its own flow control and regulation so that individual subsets may be throttled or simply switched on and off. FIG. 7 shows such embodiment. Microjet orifice 28 belongs to a first subset of microjet arrays. It is located relatively close to leading edge 26. Flow to this first subset is controlled by valve 30. Microjet orifice 29 belongs to a second subset of microjet arrays. It is located further away from leading edge 26. Flow to this second subset is controlled by valve 31.

Figure 5:
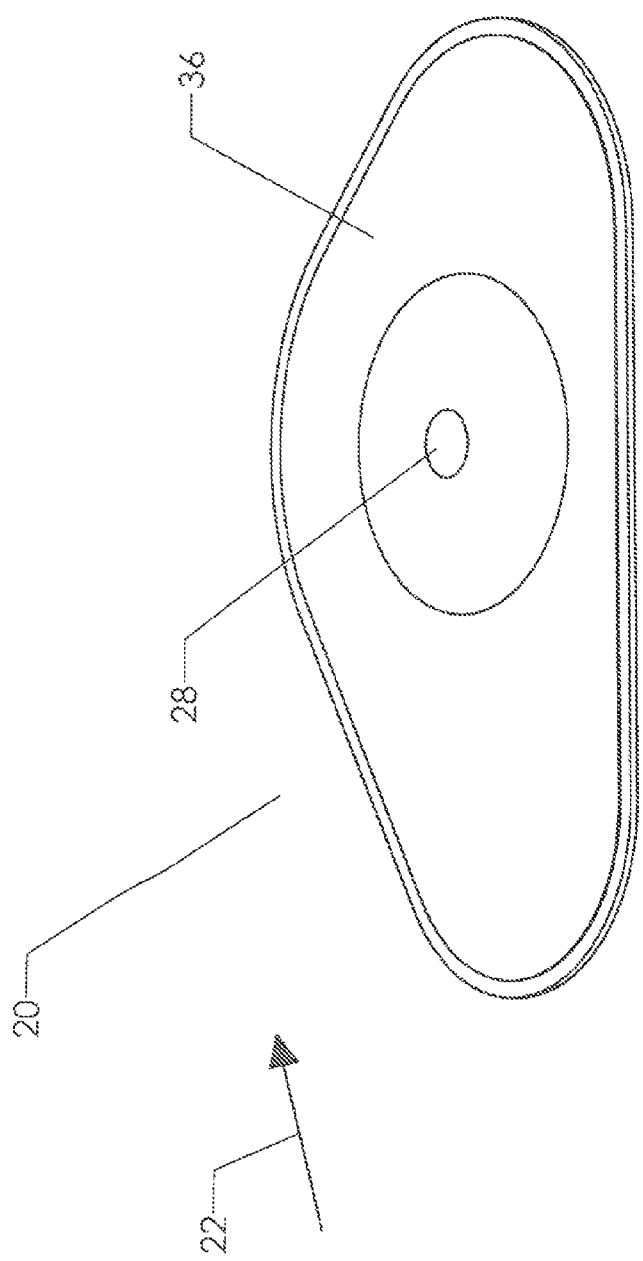
FIG. 5 is a perspective view, showing an extending passive flow control device with an incorporated microjet in a stowed position.
Figure 6:
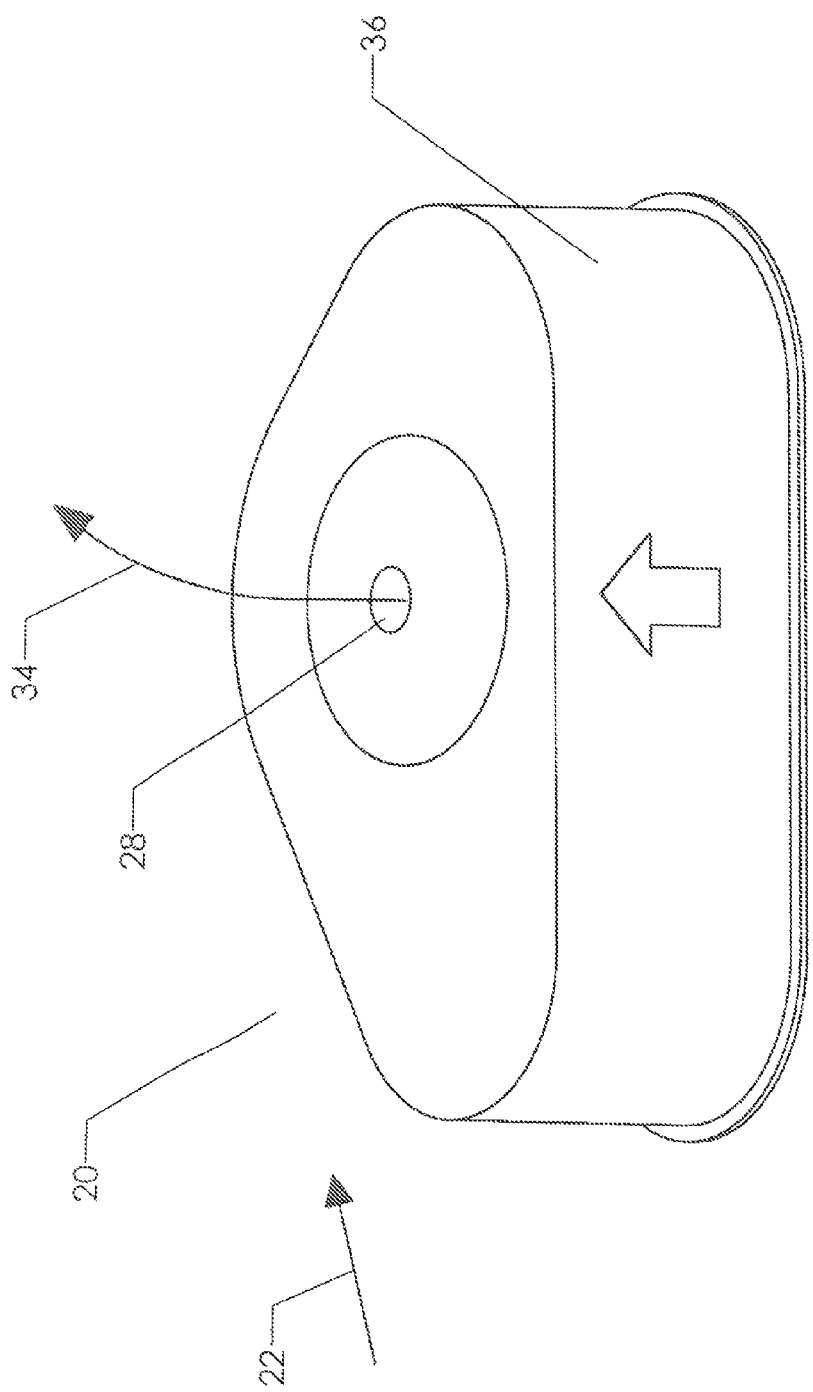
FIG. 6 is a perspective view, showing an extending passive flow control device with an incorporated microjet in an extended position.

The microjet orifices can be combined with other passive or active flow control techniques to further refine the invention. FIGS. 5 and 6 show one such combination. In FIG. 5, microjet orifice 28 is located in extending passive device 36. Extending passive device 36 is in a retracted position where its uppermost surface lies substantially flush with roof 20, so that prevailing airflow 22 flows smoothly over the device.

In FIG. 6, extending passive device 36 has been thrust upward into airflow 22. Microjet 34 has also been created by applying pressure to the microjet orifice. The result is a combined effect produced by the protrusion of extending passive device 36 and microjet 34. Of course, the microjet can also be created when extending passive device 36 is in the position shown in FIG. 5. This allows the creation of a staged effect. The microjet orifice can also be combined with fixed flow modifying devices, such as vortex generators.

Using the present invention, a dramatic reduction in noise is possible. Typical cavity noise in a moving vehicle peaks in the range of 10-30 Hz. A crude proof-of-concept model using the present invention has demonstrated a reduction greater than 10 decibels in this frequency range. Much more improvement is likely possible by refining the design and configuring it to suit each cavity to which it is applied.

Of course, in addition to the noise reduction, the microjets can likely be used to reduce drag over an open cavity. The noise produced in the absence of the microjets represents unsteady flow and generally increased drag. Using the microjets smoothes the flow and actually reduces the drag. Thus, the microjets may offer a performance advantage as well (depending on whether the drag reduction will offset the amount of energy required to pressurize the air).

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Many modifications and other embodiments of the invention will come to mind to one skilled in the art to which this invention pertains having the benefit of the teachings presented in the foregoing descriptions and the associated drawings.

The invention claimed is:

1. A method for controlling flow across an opening in an exterior surface, with said opening being bounded in part by a leading edge, and with air flowing over said exterior surface in a direction which is substantially parallel to said exterior surface, comprising:

a. providing an array of microjets proximate said leading edge;

b. wherein each microjet in said array is approximately normal to said exterior surface;
c. wherein each microjet in said array has a diameter between about 200 micrometers and about 1 millimeter;
d. providing a source of compressed air with a pressure between about 2 psi and about 30 psi above an ambient pressure;
e. providing at least one valve selectively connecting said array of microjets to said source of compressed air; and
f. activating said at least one valve in order to produce high speed flow from said microjets, thereby disrupting the formation of large scale rotating structures in said flow across said opening.

2. A method for controlling flow as recited in claim 1, wherein said at least one valve is a throttling valve capable of varying the pressure of said compressed air delivered to said array of microjets.

3. A method for controlling flow as recited in claim 1, wherein:
a. said opening and said exterior surface are part of an automobile having an engine; and
b. said compressed air is provided by a mechanical compressor driven by said engine.

4. A method for controlling flow as recited in claim 1, wherein said source of compressed air is an electrically driven compressor.

5. A method for controlling flow as recited in claim 1, wherein:
a. said array of microjets is divided into at least two sets; and
b. at least two valves are provided for independently connecting each set of microjets to said source of compressed air.

6. A method for controlling flow as recited in claim 1, further comprising:
a. providing an extending passive device proximate said leading edge, wherein said extending passive device is configured to move between a retracted position and an extended position in which said extending passive device extends into said flow; and
b. locating at least one of said microjets in said extending passive device.

7. A method for controlling flow as recited in claim 2, further comprising:
a. providing an extending passive device proximate said leading edge, wherein said extending passive device is configured to move between a retracted position and an extended position in which said extending passive device extends into said flow; and
b. locating at least one of said microjets in said extending passive device.

8. A method for controlling flow as recited in claim 3, further comprising:
a. providing an extending passive device proximate said leading edge, wherein said extending passive device is configured to move between a retracted position and an extended position in which said extending passive device extends into said flow; and
b. locating at least one of said microjets in said extending passive device.

9. A method for controlling flow as recited in claim 4, further comprising:
a. providing an extending passive device proximate said leading edge, wherein said extending passive device is configured to move between a retracted position and an extended position in which said extending passive device extends into said flow; and
b. locating at least one of said microjets in said extending passive device.

10. A method for controlling flow as recited in claim 5, further comprising:
a. providing an extending passive device proximate said leading edge, wherein said extending passive device is configured to move between a retracted position and an extended position in which said extending passive device extends into said flow; and
b. locating at least one of said microjets in said extending passive device.

11. A method for controlling flow across an opening in an exterior surface, comprising:
a. providing an array of microjets in said surface, with said array of microjets being upstream or in the vicinity of said opening and proximate said opening;
b. wherein each microjet in said array is approximately normal to said exterior surface;
c. wherein each microjet in said array has a diameter between about 200 micrometers and about 1 millimeter;
d. providing a flow control device for directing high speed air flow through said microjets; and
e. activating said flow control device in order to produce said high speed air flow from said microjets, thereby disrupting the formation of large scale coherent structures in said flow across said opening.

12. A method for controlling flow as recited in claim 11, wherein said flow control device is at least one throttling valve capable of varying the pressure of said high speed air flowing through said microjets.

13. A method for controlling flow as recited in claim 11, wherein:
a. said opening and said exterior surface are part of an automobile having an engine; and
b. said flow control device includes a mechanical compressor driven by said engine, with said mechanical compressor supplying compressed air.

14. A method for controlling flow as recited in claim 11, wherein said flow control device includes an electrically driven compressor supplying compressed air.

15. A method for controlling flow as recited in claim 11, wherein:
a. said array of microjets is divided into at least two sets; and
b. at least two valves are provided in said flow control device for independently connecting each set of microjets to said source of compressed air.

16. A method for controlling flow as recited in claim 11, further comprising:
a. providing an extending passive device proximate said opening, wherein said extending passive device is configured to move between a retracted position and an extended position in which said extending passive device extends into said flow; and
b. locating at least one of said microjets in said extending passive device.

17. A method for controlling flow as recited in claim 12, further comprising:
a. providing an extending passive device proximate said opening, wherein said extending passive device is configured to move between a retracted position and an extended position in which said extending passive device extends into said flow; and
b. locating at least one of said microjets in said extending passive device.

18. A method for controlling flow as recited in claim 13, further comprising:

a. providing an extending passive device proximate said opening, wherein said extending passive device is configured to move between a retracted position and an extended position in which said extending passive device extends into said flow; and
b. locating at least one of said microjets in said extending passive device.

19. A method for controlling flow as recited in claim 14, further comprising:
a. providing an extending passive device proximate said opening, wherein said extending passive device is configured to move between a retracted position and an extended position in which said extending passive device extends into said flow; and
b. locating at least one of said microjets in said extending passive device.

20. A method for controlling flow as recited in claim 15, further comprising:
a. providing an extending passive device proximate said opening, wherein said extending passive device is configured to move between a retracted position and an extended position in which said extending passive device extends into said flow; and
b. locating at least one of said microjets in said extending passive device.

\* \* \* \* \*